US005589864A

United States Patent [19]

Hadimioglu

[11] Patent Number: 5,589,864

[45] Date of Patent: Dec. 31, 1996

[54] INTEGRATED VARACTOR SWITCHES FOR ACOUSTIC INK PRINTING

[75] Inventor: Babur B. Hadimioglu, Mountain View, Calif.

[73] Assignee: Xerox Corporation, Stamford, Conn.

[21] Appl. No.: 316,141

[22] Filed: Sep. 30, 1994

[51] Int. Cl.[6] .................................. B41J 2/07; H02J 1/00

[52] U.S. Cl. ................................ 347/46; 347/12; 437/60; 437/919; 361/281; 310/313 R; 307/73; 148/DIG. 14

[58] Field of Search ........................ 347/46, 12; 257/312, 257/254, 347; 361/281, 277, 280, 287, 290, 283.1, 283.2, 283.3, 283.4, 291; 332/175, 178; 334/15; 30/313 R; 333/186, 187, 193; 331/107 A, 108 C, 154, 155, 177 R, 177 V; 437/60, 919; 148/DIG. 14; 307/72, 73

[56] References Cited

U.S. PATENT DOCUMENTS

| | | | |
|---|---|---|---|
| 3,648,340 | 3/1972 | MacIver | 257/312 X |
| 4,250,384 | 10/1981 | Pulvari | 250/330 |
| 4,751,530 | 6/1988 | Elrod et al. . | |
| 4,782,350 | 11/1988 | Smith et al. | 347/46 |
| 5,038,184 | 8/1991 | Chiang et al. | 257/312 |
| 5,166,646 | 11/1992 | Avanic et al. | 257/312 |
| 5,389,956 | 2/1995 | Hadimioglu et al. | 347/12 |

FOREIGN PATENT DOCUMENTS

| | | |
|---|---|---|
| 0586187A2 | 3/1994 | European Pat. Off. . |
| 4100705 | 7/1991 | Germany . |

*Primary Examiner*—Valerie Lund
*Attorney, Agent, or Firm*—Oliff & Berridge

[57] ABSTRACT

An integrated varactor and piezoelectric device for an acoustic ink jet ejector includes a substrate having a first surface, the silicon substrate forming a first electrode, an epitaxial layer formed over the first surface of the silicon substrate, a silicon dioxide layer formed over the epitaxial layer, a second electrode formed over the silicon dioxide, a piezoelectric layer formed over the second electrode, a third electrode formed over the piezoelectric layer and an acoustic lens formed over a second surface of the silicon substrate. The acoustic lens is aligned with the center of the piezoelectric layer generally along an axis perpendicular to the first and second surfaces of the silicon substrate.

20 Claims, 10 Drawing Sheets

INTEGRATED VARACTOR SWITCHES FOR ACOUSTIC INK PRINTING

BACKGROUND OF THE INVENTION

1. Field of the Invention

This invention relates to an integrated varactor with a piezoelectric device for an acoustic ink printhead. In particular, the varactor is integrated with the printhead by placing it directly on the substrate.

2. Description of Related Art

FIG. 1 shows a conventional acoustic ink jet printhead ejector 100. An ink channel 112 is formed in a channel forming layer 110. A Fresnel lens 108 is formed on the surface of a glass substrate 102 and the channel forming layer 110 is bonded to the substrate 102 such that the Fresnel lens is within the ink channel 112. An opening 122 to the ink channel 112 is formed on a top surface 120 of the channel forming layer 110. During normal operation, ink fills the ink channel 112 to form an ink free-surface 114 at the opening 122. A piezoelectric device 31, positioned on the opposite side of the substrate 102 from the ink channel 112, comprises two electrodes 32 and 104 and a piezoelectric layer 106. When an radio-frequency (RF) signal from an RF source 34 is applied between the electrodes 32 and 104, the piezoelectric device 31 generates acoustic energy in the substrate 102 directed toward the ink channel 112. The Fresnel lens 108 focuses the acoustic energy entering the ink channel 112 from the substrate 102 onto the ink freesurface 114. The ink in the ink channel 112 forms an ink mound 116 in the ink-free surface 114. The ink mound 116 eventually becomes an ink drop 118 moving toward a recording medium.

In conventional acoustic ink jet printheads, an RF switch such as a PIN diode or a varactor controls ink ejection by switching the RF signal on and off. Where a varactor is used as an RF switch, the RF signal powers the varactor and the piezoelectric device 31, which are serially connected. In this circuit, the varactor functions as a capacitor switch for the piezoelectric device. When the varactor capacitance is increased above a threshold by increasing a control signal to the varactor, the piezoelectric device 31 activates, causing an ink drop 118 to be ejected from the ink channel 112.

Conventionally, an acoustic ink jet printhead contains an array of the ejectors 100. Because varactors are not manufactured on the same substrate as the piezoelectric device 31, individual varactors are placed onto the printhead substrate and electrically connected to the printhead by wire bonding. Thus, manufacturing conventional printheads not only incurs undesirable assembly costs, but also prevents manufacturing of high density ejector printheads, since space must be allowed for manually assembling the varactors.

FIG. 2 shows a known method for integrating varactors into the printhead. This acoustic ink jet ejector includes a substrate 102, which may be silicon, having an acoustic lens 208. The acoustic lens 208 focuses the acoustic energy from the substrate 102 onto the ink free-surface 114. The lens 208 performs a similar function as the Fresnel lens 108 of FIG. 1. A piezoelectric device 31 and a varactor 10 are formed on the surface of the substrate 102 opposite the lens 208. The piezoelectric device 31 comprises the first electrode 104 formed on the substrate 102, the piezoelectric layer 106 formed on the first electrode 104 and the second electrode 32 formed on the piezoelectric layer 106. The varactor 10 includes a dielectric layer 210, an amorphous silicon (aSi) layer 212, an interface layer 214 and a third electrode 216.

This integrated acoustic ink jet ejector/varactor operates similarly to the ejector shown in FIG. 1. The piezoelectric device 31 is formed directly on the substrate 102 to ensure the acoustic energy generated by the piezoelectric device 31 easily flows into the substrate 102. The varactor 10 is formed on the piezoelectric device 31 on the side opposite the substrate 102.

Placing the varactor 10 on the piezoelectric device 31 requires first forming the dielectric layer 210 on the electrode 32 and then forming the active varactor layer 212 over the dielectric layer 210. Conventionally, aSi is used as the active layer 212 material because the processing temperature for aSi is more compatible with the temperature range that can be withstood by the piezoelectric layer 106. However, because aSi is very resistive, the operating frequency range of the varactor 10 is limited to below the operating frequency range of acoustic ink jet ejectors 100.

SUMMARY OF THE INVENTION

This invention integrates a varactor and a piezoelectric device onto a common printhead substrate that is capable of functioning at high frequencies. In particular, it is capable of operating in the 100–200 MHz range required for acoustic ink jet ejectors. The integrated varactor-piezoelectric device comprises a varactor and a piezoelectric device formed over the varactor. The varactor is formed by providing a silicon substrate, which is a first electrode, forming an epitaxial layer over the substrate, forming a silicon dioxide ($SiO_2$) layer over the epitaxial layer and then forming a second electrode over the $SiO_2$ layer. The substrate, the epitaxial layer, the $SiO_2$ layer and the second electrode form the varactor. The piezoelectric device comprises a piezoelectric layer, such as ZnO, deposited over the second electrode and a third electrode formed over the piezoelectric layer. The second and third electrodes and the piezoelectric layer form the piezoelectric device.

When the acoustic ink jet printhead of this invention is incorporated into an electrical circuit, an RF source powers the integrated varactor-piezoelectric device by connecting the RF source across the substrate and the third electrode. A DC control signal source, connected between the substrate and the second electrode, modulates the capacitance of the varactor. A control signal activates the acoustic ink jet printhead ejector by increasing the capacitance of the varactor above a predetermined threshold. The acoustic ink jet printhead ejector is deactivated by decreasing the capacitance of the varactor below the predetermined threshold.

These and other objects and advantages will become apparent from the following detailed description in connection with the drawings.

BRIEF DESCRIPTION OF THE DRAWINGS

The invention will be described in detail with reference to the following drawings, wherein.

DETAILED DESCRIPTION OF THE PREFERRED EMBODIMENTS

Figure 3:
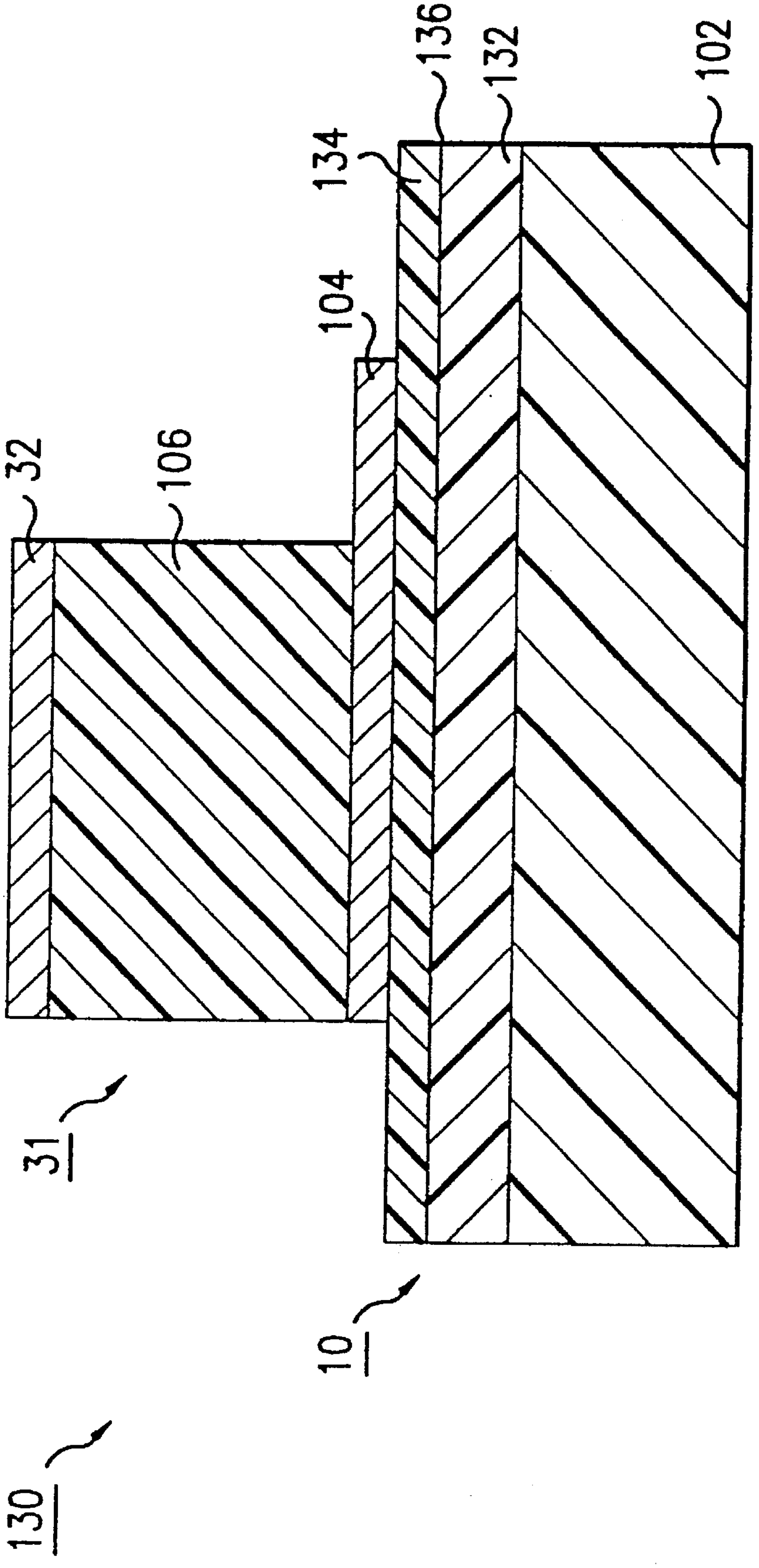
FIG. 3 is a cross-sectional view of a first embodiment of the varactor-piezoelectric device of this invention.

FIG. 3 shows a first preferred embodiment of the varactor/piezoelectric device 130. The varactor 10 includes an epitaxial layer 132 formed over a silicon substrate 102, which serves as a first electrode, a silicon dioxide ($SiO_2$) layer 134 formed over the epitaxial layer 132 and a second electrode 104 formed over the $SiO_2$ layer 134. The piezoelectric device 31 is formed over the varactor 10 and includes the piezoelectric layer 106 formed over the second electrode 104 and a third electrode 32 formed over the piezoelectric layer 106.

The varactor/piezoelectric device 130 functions based on the signals input to the substrate 102, which acts as a first electrode, the second electrode 104 and the third electrode 32. Normally, the RF signal is applied across the substrate 102 and the third electrode 32, while a control signal is applied across the substrate 102 and the second electrode 104. The varactor/piezoelectric device 130 functions as two capacitors connected in series. When the varactor 10 capacitance is below a predetermined threshold, the RF signal is effectively disconnected from the piezoelectric device 31. However, when the varactor 10 capacitance is above the predetermined threshold, the RF signal drives the piezoelectric device 31 to generate the acoustic energy needed for ink ejection.

Figure 4:
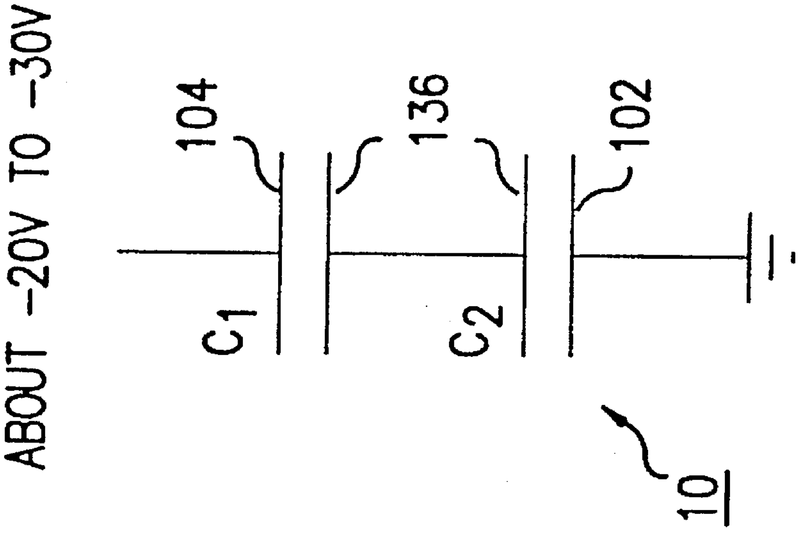
FIG. 4 is a circuit diagram of the varactor of FIG. 3 with a control signal of about −20 V to −30 V.

The varactor 10 capacitance is controlled by the control signal. As shown in FIG. 4, when the control signal is about −20 V to −30 V for an n-doped expitaxial layer 132, the epitaxial layer 132 is depleted and the operation of the varactor 10 is modeled as two capacitors C1 and C2. The first capacitor C1 is formed by the second electrode 104 and an interface 136 between the $SiO_2$ layer 134 and the epitaxial layer 132. The second capacitor C2 is formed by the interface 136 and the substrate 102. The capacitance values of capacitors C1, C2 and the varactor is $C_1$, $C_2$ and $C_v$ respectively.

Figure 5:
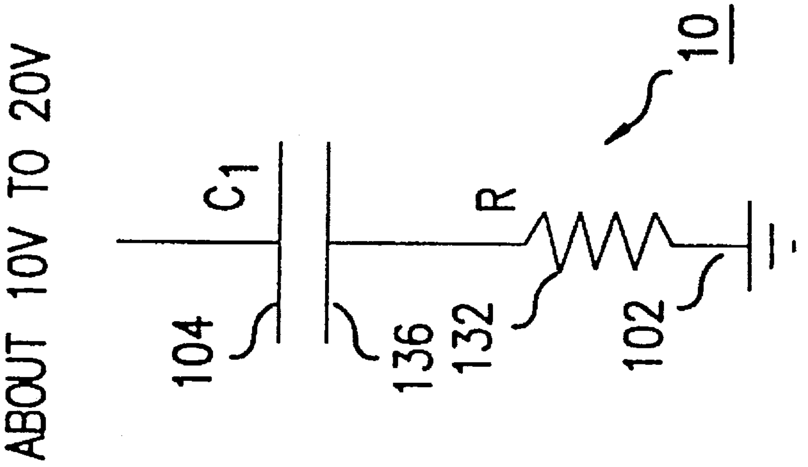
FIG. 5 is a circuit diagram of the varactor of FIG. 3 with a control signal of about 10–20 V.

When the control signal is about −20 V to −30 V, the capacitance value $C_v$ of the varactor 10 is equal to the capacitance value of the first and second capacitors C1 and C2 when connected in series. This leads to a varactor capacitance $C_v$ that is less than the capacitance values $C_1$ or $C_2$ of either the first or second capacitors C1 or C2 alone. When the control signal is about 10 V to 20 V, the electrode 104 is biased more positively than the substrate 102. Thus, electrons from the substrate 102 are attracted to the electrode 104 and accumulate in the epitaxial layer 132. This causes the epitaxial layer 132 to become resistive. Thus, when the control signal is 10 V to 20 V, the integrated varactor/piezoelectric device is modeled as the first capacitor C1 serially connected to a resistor R, as shown in FIG. 5. Accordingly, the capacitance $C_v$ of the varactor is substantially identical to the capacitance $C_1$ of the first capacitor C1.

Figure 1:
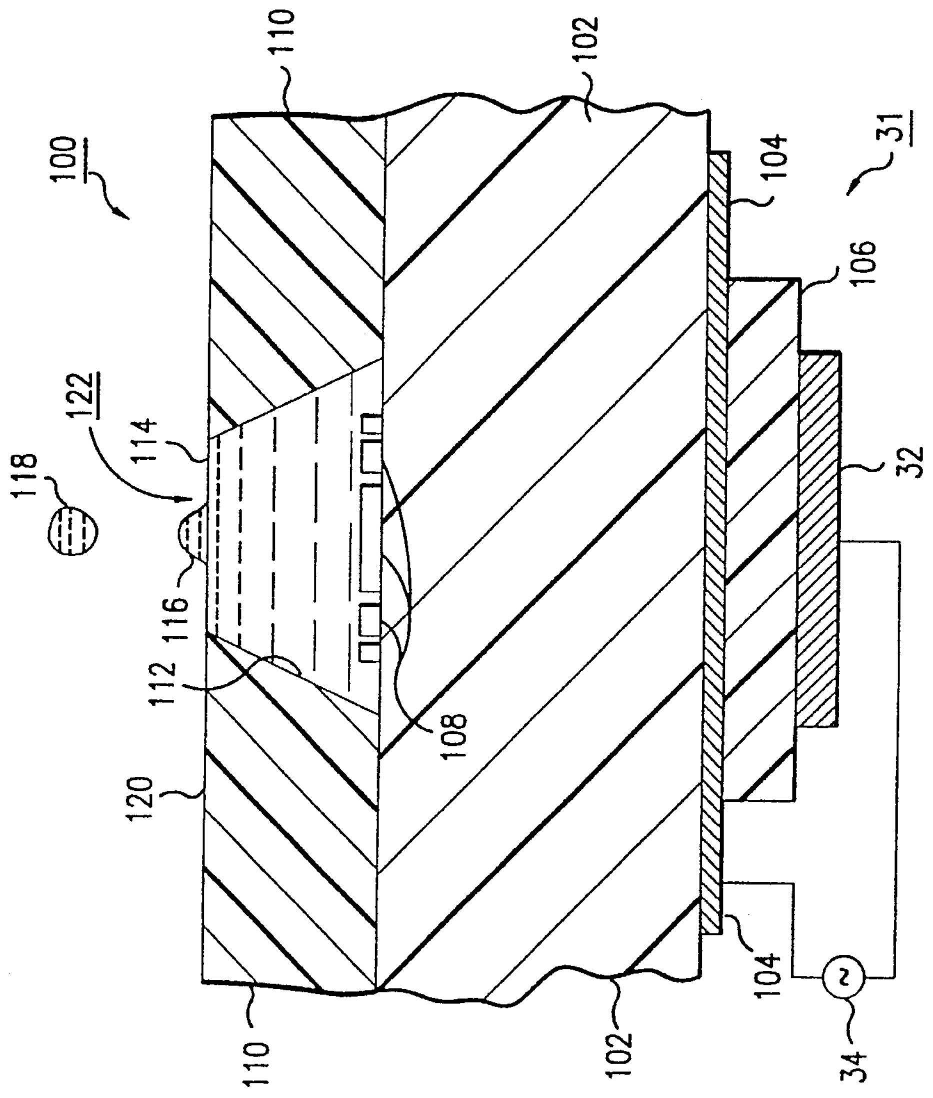
FIG. 1 PRIOR ART
FIG. 1 is a cross-sectional view of a conventional acoustic ink jet ejector.
Figure 2:
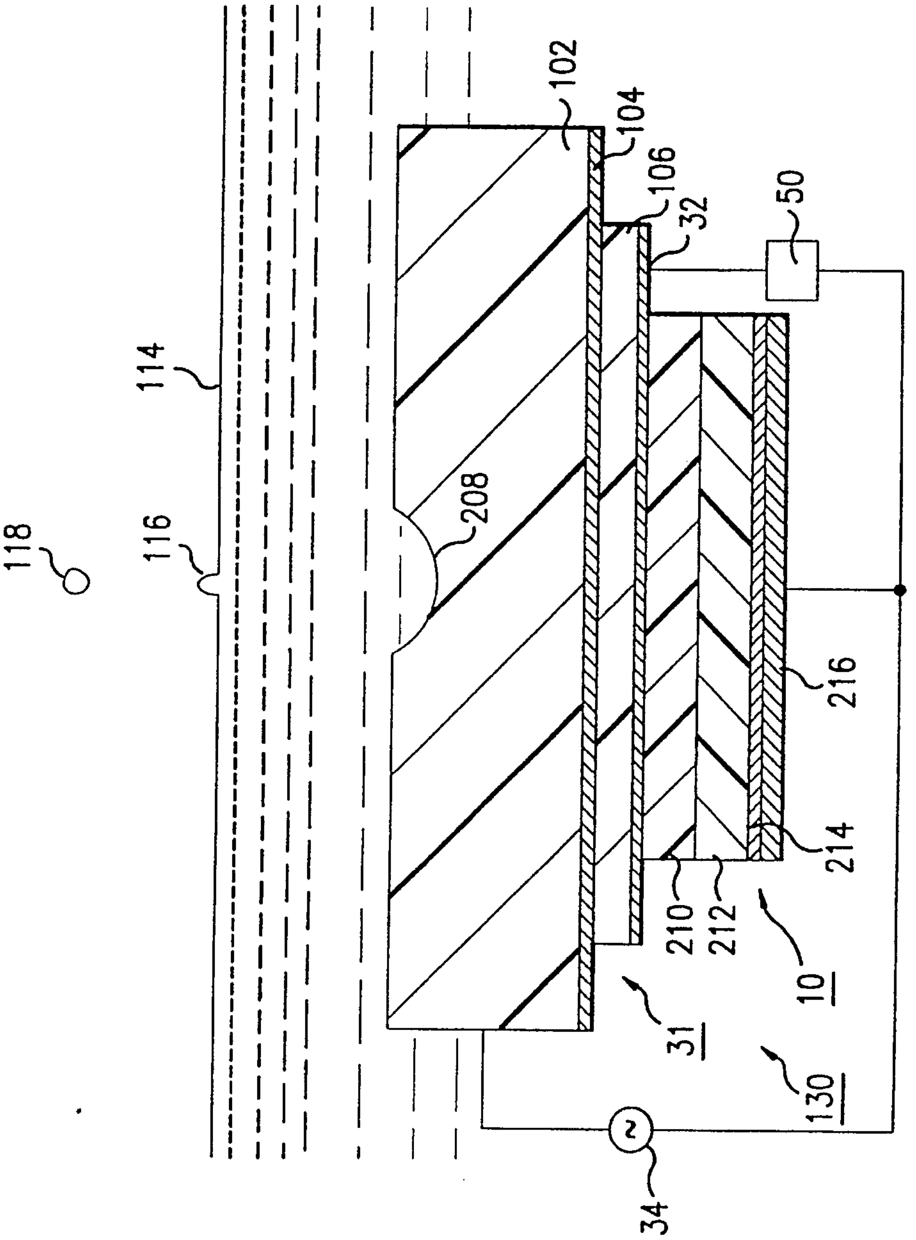
FIG.2 PRIOR ART
FIG. 2 is a cross-sectional view of a known integrated amorphous silicon varactor/piezoelectric device and an acoustic ink jet printhead ejector.

However, when the value of R is large, the current is restricted from flowing freely to the capacitor C1 and limits the varactor 10 to operate only at low frequencies. This is the case when aSi is used as the active varactor layer 212, as shown in FIG. 2. aSi is known to have high resistivities and a varactor 10 having aSi as the active layer is limited only to low frequency operations.

The resistivity of aSi can be reduced by fabricating a very thin aSi layer. However, a thin layer of aSi also requires a thin dielectric layer 210. Unfortunately, a thin dielectric layer 210 leads to low voltage breakdowns which restrict the operating voltages to below operating requirements for acoustic ink jet printhead ejectors 100.

By making the capacitance value $C_1$, very large and the capacitance value $C_2$ very small, the varactor 10 becomes an RF signal switch. When the control signal is about −20 V to −30 V, the varactor capacitance $C_v$ is less than the capacitance $C_2$, which is very small. When $C_v$ is a very small value, the varactor 10 conducts only a very small amount of the RF signal, thus the varactor 10 effectively is an open circuit to the RF signal. When the control signal is about 10 V to 20 V and the value of R is small, the varactor capacitance $C_v$ is substantially equal to the capacitance $C_1$, which is very large. In this condition, the varactor 10 conducts a large amount of the RF signal and the varactor 10 appears as a conductor to the RF signal.

When the epitaxial layer 132 is used according to this invention, the effective resistivity of the resistor R can be controlled by adjusting the doping levels of the epitaxial layer 132. When the resistivity of the epitaxial layer is about 10–50 Ωcm, the varactor 10 easily operates in the 100–200 MHz range required for acoustic ink jet ejectors.

The varactor/piezoelectric device 130 is switched on and off by switching the control signal between about −20 V to −30 V and about 10 V to 20 V respectively. When the control signal is about −20 V to −30 V, the small capacitance value of the varactor 10 presents a high impedance to the RF power source and prevents RF power from reaching the piezoelectric device 31. When the control signal is raised to about 10 V to 20 V, the varactor 10 capacitance value increases dramatically, which effectively connects the RF power to the piezoelectric device 31, causing the ejector 100 to eject at least one ink drop 118.

Of course, it should be appreciated that when the epitaxial layer 132 is p-doped, the control signals switching the varactor 10 on and off mirror-image the control signals for the n-doped epitaxial layer 132 discussed above. For p-doped epitaxial layer 132, the control signal of about 20–30 V switches the varactor off, while the control signal of −10 V to −20 V switches the varactor on. Of course, it is understood that any appropriate control means such as an RF source can be used for applying the control signals.

While the epitaxial layer 132 provides a solution for high frequency varactor operation, other problems are introduced. The piezoelectric device 31 of conventional acoustic ink jet ejectors is placed directly on the substrate 102 of the printhead 100 to maximize the transfer of acoustic energy generated by the piezoelectric device 31 to the substrate 102. Thus, in conventional devices, the piezoelectric device 31 is placed directly on the substrate 102.

However, when the piezoelectric device 31 is placed on the substrate 102, the varactor 10 must be placed on the piezoelectric device 31. This arrangement introduces another difficulty. The piezoelectric layer 106 cannot be subjected to very high temperatures. When the varactor 10 must be placed over the piezoelectric device 31, an epitaxial layer 132 cannot be used for the active layer since a temperature of about 1000° C. is required to deposit quality epitaxial layers 132. For this reason, conventional art uses aSi because process temperatures for aSi can be as low as 200° C.

Additionally, any non-silicon surface provides a poor starting surface for silicon epitaxial layers 132. To form a varactor 10 over the piezoelectric device 31, the dielectric layer 210 must be formed first. This dielectric layer 210 further complicates the use of the epitaxial layer 132 as the active varactor layer for the acoustic ink jet printhead ejector shown in FIG. 2.

Figure 6:
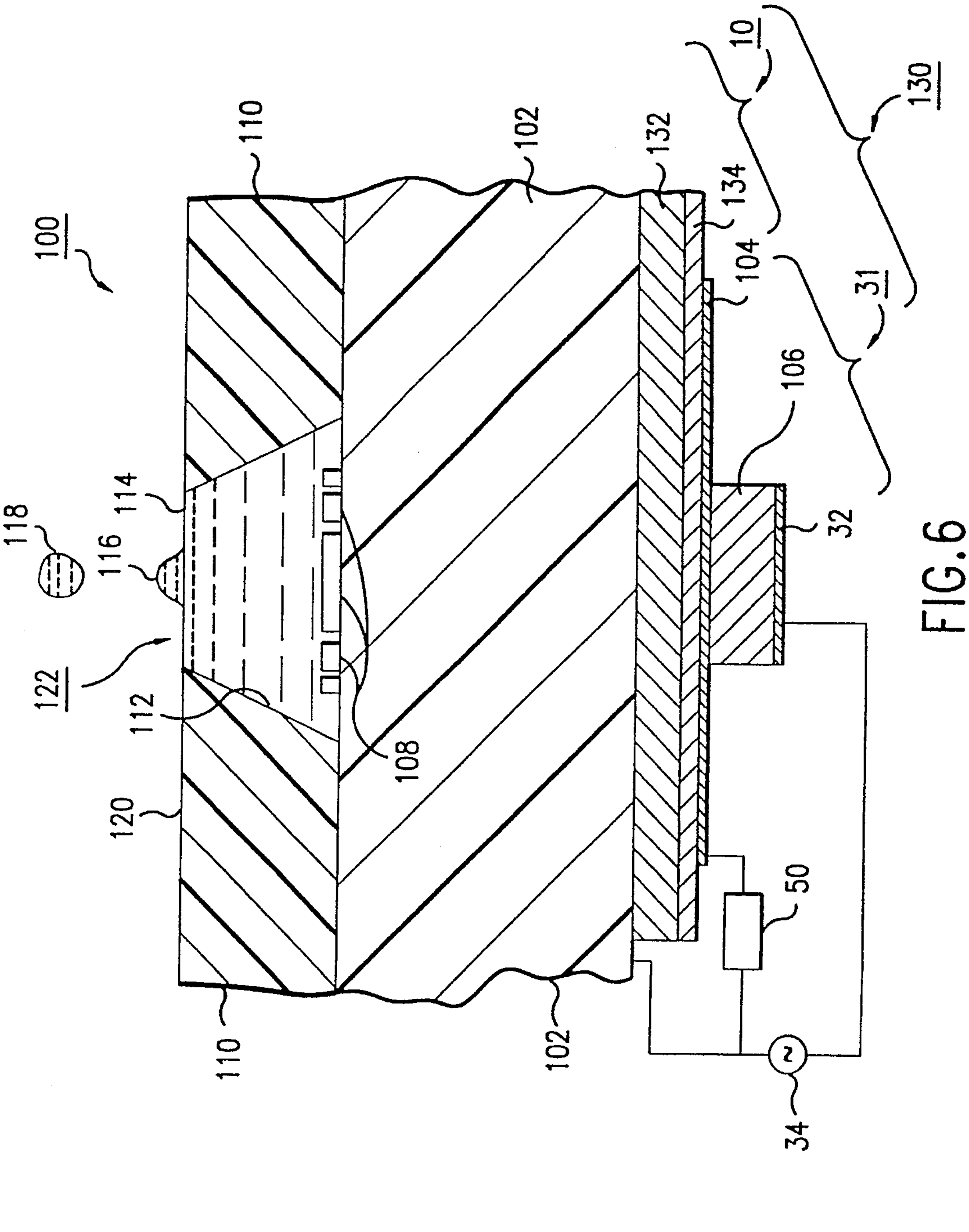
FIG. 6 is a cross-sectional view of a first embodiment of the acoustic ink jet ejector incorporating the integrated varactor/piezoelectric device.

In the first embodiment of the integrated varactor/piezoelectric device 130 of this invention as shown in FIG. 6, the varactor 10 is directly inserted between the substrate 102 and the piezoelectric device 31. The active layer of the varactor 10 is the epitaxial layer 132, which is about 5–10 μm thick and formed directly on the silicon substrate 102. The $SiO_2$ layer 134 is about 0.2–0.3 μm thick and is deposited on the epitaxial layer 132 to form the varactor dielectric. The second electrode 104 is a metal layer of about 0.1–0.2 μm thick and is formed on the $SiO_2$ layer 134. The substrate 102 is doped to become a conductor and acts as a first electrode. Thus, the substrate 102, the epitaxial layer 132, the $SiO_2$ layer 134 and the second electrode 104 form the varactor 10. The piezoelectric layer 106 is formed over the second electrode 104 and a third electrode 32 is formed over the piezoelectric layer 106 to complete the piezoelectric device 31.

As discussed above, the acoustic energy generated by the piezoelectric device 31 must travel through the varactor 10 before reaching the substrate 102. The thickness ranges indicated above allow efficient transfer of acoustic energy through the varactor 10 is achieved.

The substrate 102 can be made conductive by either doping the complete substrate 102 into a conductive state or by doping only selected areas devoted to varactor/piezoelectric devices 130. Doping only selected areas is preferable when devices other than varactor/piezoelectric devices 130 will be formed on the substrate 102. The integration of logic devices using the substrate 102 is an advantage provided by this invention.

Figure 7:
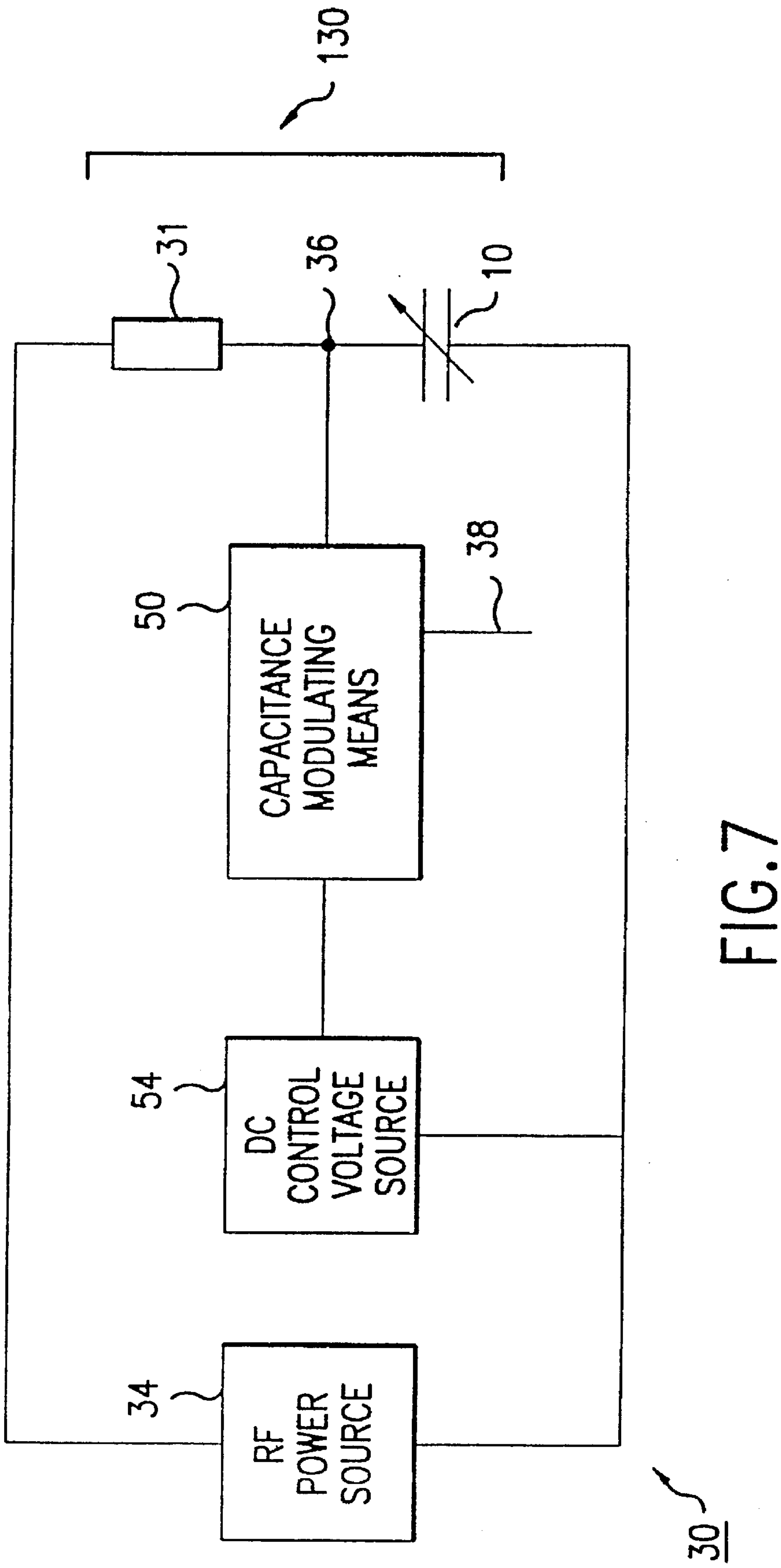
FIG. 7 is a block diagram of the varactor/piezoelectric device, the RF power source, the DC control voltage source, and capacitance modulating means.

FIG. 7 is an equivalent circuit 30 for the acoustic ink jet ejector 100 shown in FIG. 6. The RF power source 34, providing a drive signal at about 30–50 V and at 100–200 MHz, is connected across the substrate 102 and the third electrode 32. A capacitance modulating means 50 is connected across the substrate 102 and the second electrode 104. The RF power source 34 supplies RF power continuously to the varactor/piezoelectric device 130. The DC control signal source 54 supplies a control signal at about −30 V to 20 V to the capacitance modulating means 50. The capacitance modulating means 50 is connected across the varactor 10. The capacitance modulating means 50 controls the capacitance of the varactor 10 by setting the voltage at node 36. The capacitance modulating means 50 receives commands from a printer controller (not shown) through signal line 38. Based on the received commands, the capacitance modulating means 50 switches the acoustic ink jet ejector 100 on or off by setting the voltage at node 36 to raise the varactor 10 capacitance above or below the predetermined threshold for ink ejection.

Figure 8:
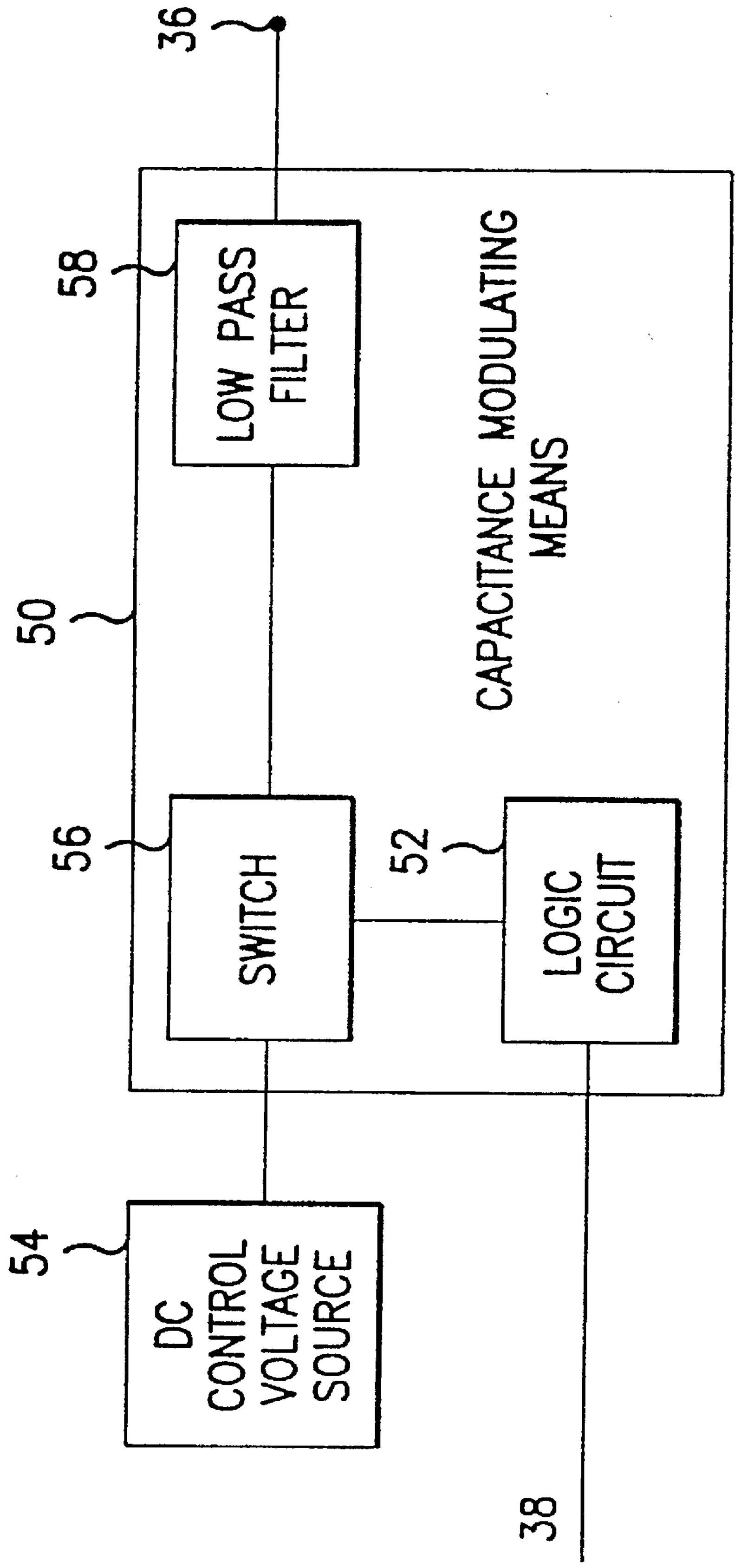
FIG. 8 is a block diagram of the capacitance modulating means.

The capacitance modulating means 50, as shown in FIG. 8, includes a switch 56, a logic circuit 52 and a low pass filter 58. The DC control signal source 54 is connected to the switch 56 to supply the control signal. The low pass filter 58 passes the control signal from the DC control signal source to the switch 56, while protecting the logic circuit 52 and the DC control signal source 54 from the RF signal at node 36.

Figure 9:
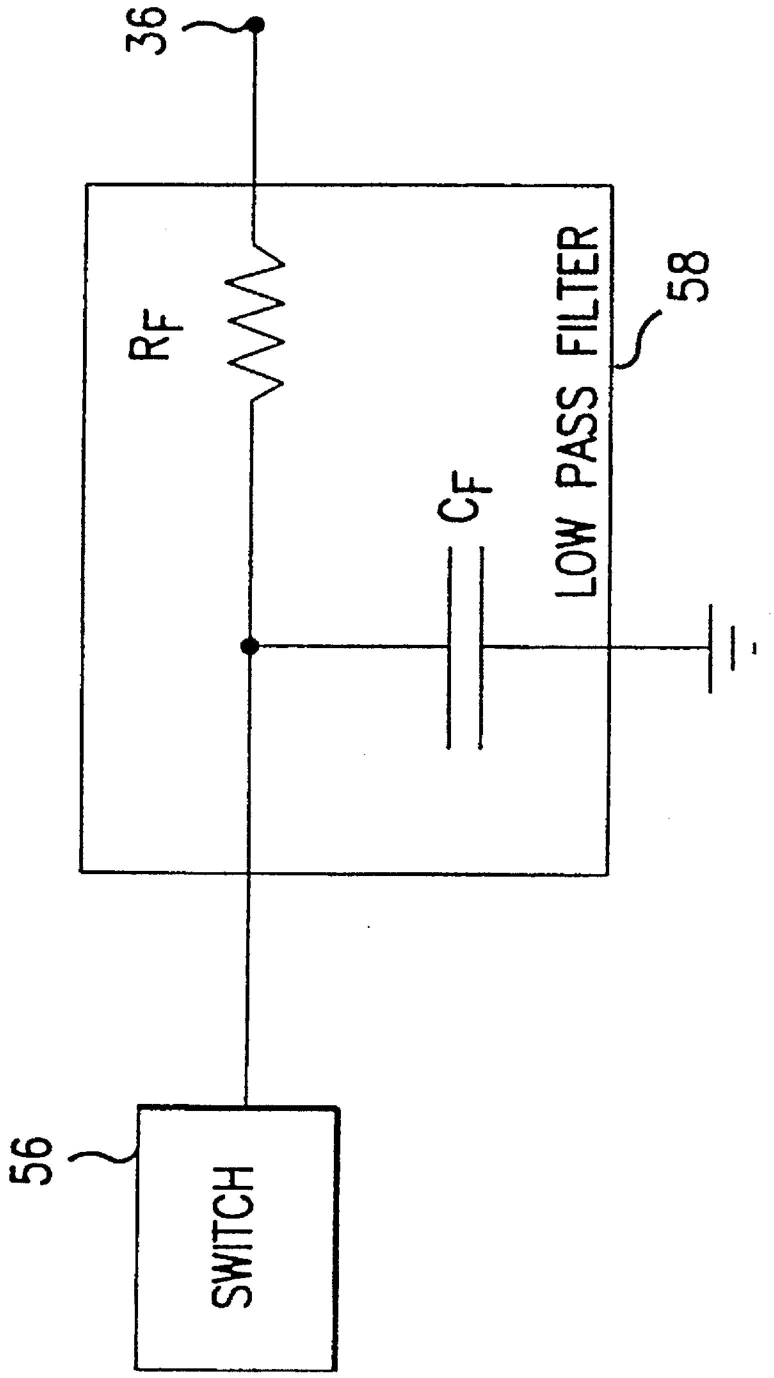
FIG. 9 is a circuit diagram of a low pass filter.

The low pass filter 58, as shown in FIG. 9, comprises a series resistor $R_F$, having a resistance in the range of 10–30 KΩ, and a shunt capacitor $C_F$, having a capacitance in the range of 20–40 pf. The RF signal at node 36 is shorted to ground by the capacitor $C_F$, while the control signal from the switch 56 is passed through the resistor $R_F$ to the node 36.

The logic circuit 52 of FIG. 8 receives commands from the printer controller (not shown) through signal line 38. Based on the received commands, the logic circuit 52 turns the switch 56 on or off. When the switch 56 is on, the control signal output by the DC control signal source 54 is connected to the low pass filter 58. The low pass filter 58, in turn, passes the control signal to the node 36 and causes the varactor 10 capacitance to increase above the predetermined threshold for ink ejection. When the switch 56 is off, the control signal is removed from the low pass filter 58. Consequently, the voltage of control signal becomes about −20 V to −30 V and the capacitance $C_v$ of the varactor 10 drops below the predetermined threshold for ink ejection.

Figure 10:
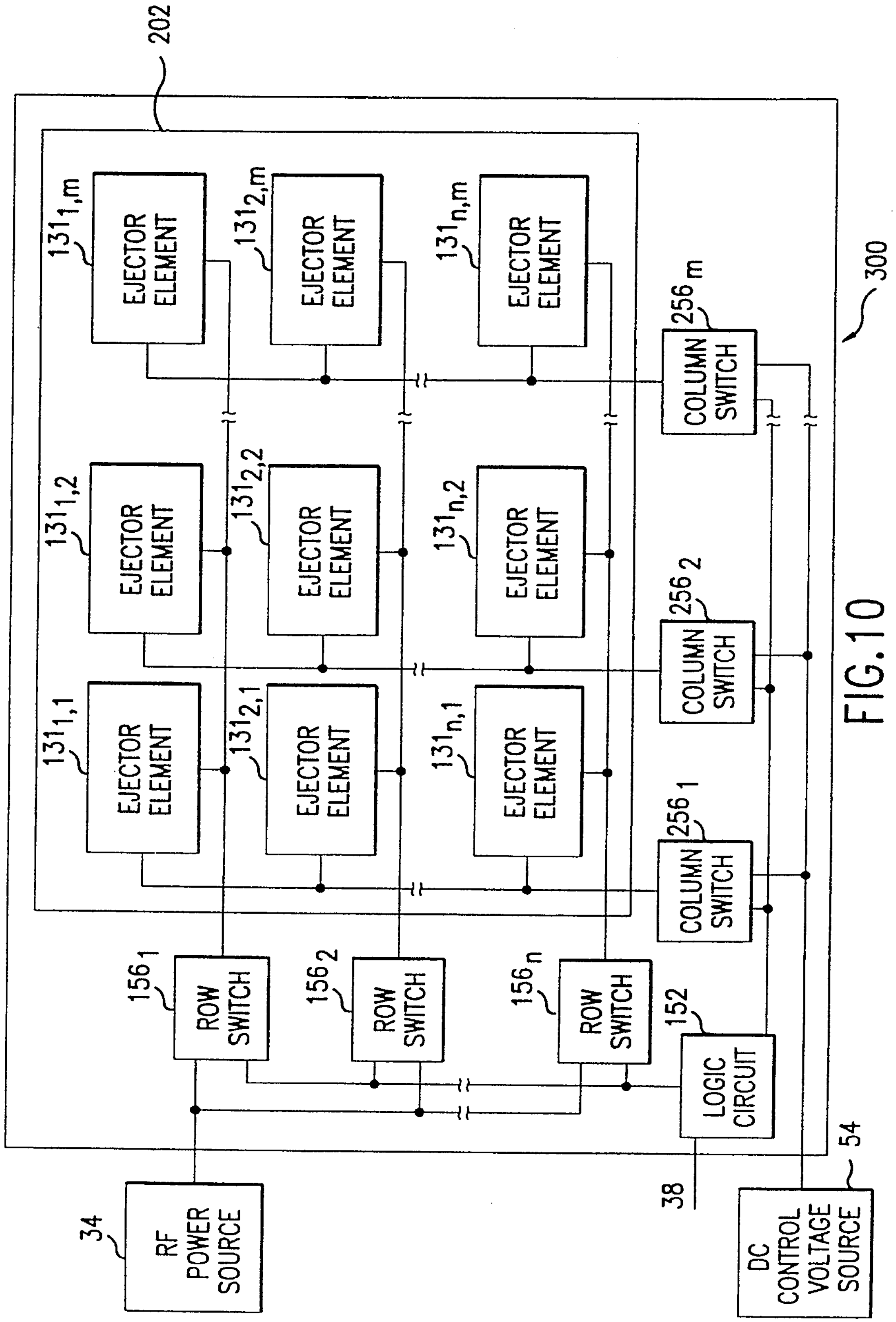
FIG. 10 is a block diagram of an array of ejectors of the printhead.
Figure 11:
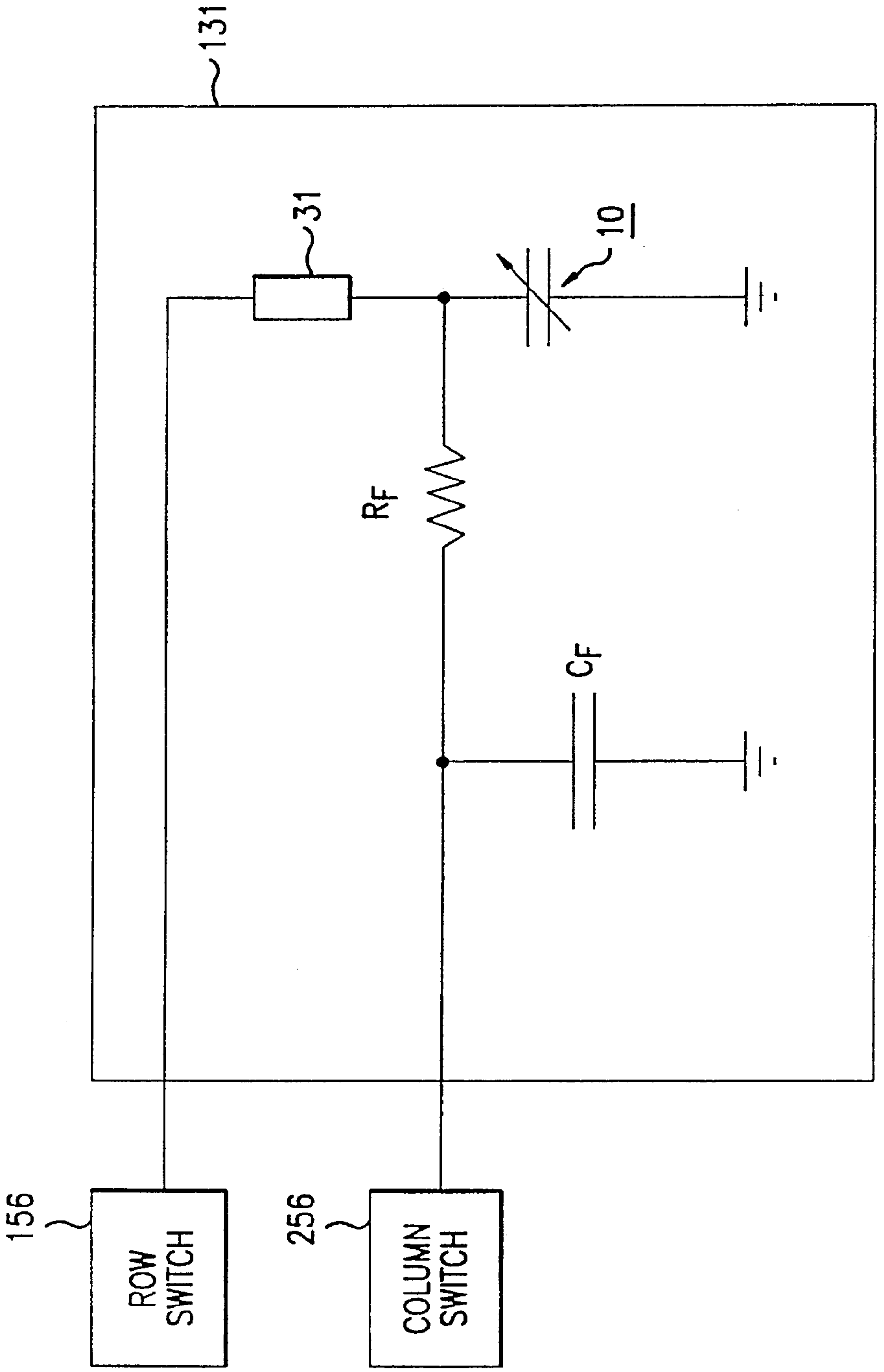
FIG. 11 is a circuit diagram of an ejector element.

A printhead 300 having an array of acoustic ink jet ejector elements 131 is shown in FIG. 10. A low pass filter 58 is incorporated with a varactorpiezoelectric device 130 to form each ejector element 131, as shown in FIG. 11. The RF power and control signals are switched by the array of row switches 156 and column switches 256, respectively. There are n rows and m columns of ejector elements 131. Each ejector element 131 is referenced by the corresponding row and column numbers. The ejector element $\mathbf{131}_{1,1}$ is the top left ejector element 131, while the ejector element $\mathbf{131}_{n,m}$ is the lower right ejector element 131. The logic circuit 152 receives commands from the printer controller (not shown) through signal line 38. Each ejector element 131 is activated by turning on one of the row switches 156 and one of the column switches 256.

The row switches 156 connect and disconnect the RF power source 34 to and from a row of the ejector elements 131 and the column switches 256 connect and disconnect the DC control signal source 54 to and from a column of the ejector elements 131. Accordingly, the logic circuit 152 selects ejector $\mathbf{131}_{1,1}$ by turning on switches $\mathbf{156}_1$ and $\mathbf{256}_1$. When ejector $\mathbf{131}_{1,1}$ is selected, the other ejector elements 131 of column 1 and rows 2-n are not selected because the RF power source is disconnected by row switches $\mathbf{156}_2$–$\mathbf{156}_n$. Even though the varactor capacitances $C_v$ of each of these ejector elements 131 are above the threshold level, the corresponding piezoelectric devices 31 are not supplied with RF power from the RF power source 34. Thus, they do not generate any acoustic energy. The ejector elements 131 of row 1 in columns 2-m are also not selected because the varactors 10 of these ejector elements 131 are switched off by column switches $\mathbf{256}_2$–$\mathbf{256}_m$.

There is no restriction that only one ejector 131 may be turned on at one time. Depending upon how the printhead 100 is configured, one sweep across the recording medium may cover multiple printing objects that require multiple ejectors 131 to eject ink. For this situation, the logic circuit 152 may turn on one row switch 156 and multiple column switches 256, turn on one column switch 256 and multiple row switches 156 or multiple row and column switches 156 and 256. However, when multiple row switches 156 are turned on, the RF signal source 34 power requirements may need to be reconsidered.

Supplying the RF power signal to the rows and the DC control signal to the columns reduces the number of the switches 156 and 256 required for the array of the ejector elements 131, and the peak power required from the RF power source. During printing, the rows are supplied with the RF power signal from the RF power source 134 sequentially, so that an any one time, only one row is connected to the RF power source. Since there are n rows, a maximum of m ejectors can be on at any one moment. Thus, the RF power source 34 needs to be able to supply power to at most m ejectors 130 during each print cycle, instead of all of the possible n×m ejectors 130 on the print head. Organizing the switches 156 and 256 to switch rows and columns also obviates the need to have one switch 56 per ejector element 131. Since there are n rows and m columns, only n+m switches are needed, instead of n×m.

Of course, one switch 56 can be incorporated into each ejector element 131 or into a subset of the ejector elements 131. However, the additional switches will increase the cost of the acoustic ink jet printhead. The use of row and column switches 156 and 256 also conserves substrate 102 area and provide for easy printhead ejector element 131 organization.

Because the substrate 102 is silicon, the devices needed to implement the logic circuit 152, the low pass filter 58 and switches 156 and 256 may be manufactured on the same substrate 102 as the varactor/piezoelectric devices 130. This integration reduces the number of wires required to connect the printhead to external electronics, leading to low manufacturing cost and a highly dense printhead. Furthermore, the ability to manufacture logic devices directly on the printhead allows for the integration of more intelligence onto the printhead and consequently, reduces the complexity of the printer controller.

As many different embodiments of this invention may be made without departing from the spirit and scope thereof, it is to be understood that the invention is not limited to the specific embodiments thereof except as defined in the appended claims.

What is claimed is:

1. An integrated varactor and piezoelectric device, comprising in order:

a silicon substrate having a first side and a second side opposite the first side, the silicon substrate being a first electrode;

an epitaxial layer located on the first side of the silicon silicon substrate, the epitaxial layer being an active layer of the varactor;

a dielectric layer located over the epitaxial layer, the dielectric layer being a dielectric of the varactor;

a second electrode located over the dielectric layer;

a piezoelectric layer located over the second electrode; and a third electrode located over the piezoelectric layer, wherein the epitaxial layer, the dielectric layer, the second electrode, the piezoelectric layer and the third electrode are located over the first side of the silicon substrate.

2. The integrated varactor and piezoelectric device of claim 1, wherein the epitaxial layer is about 5–10 μm thick.

3. The integrated varactor and piezoelectric device of claim 1, wherein the second electrode is about 0.1–0.2 μm thick.

4. The integrated varactor and piezoelectric device of claim 1, wherein the epitaxial layer is doped to a resistivity of about 10 to 50 Ωcm.

5. The integrated varactor and piezoelectric device of claim 1, wherein the dielectric layer is a silicon dioxide layer.

6. The integrated varactor and piezoelectric device of claim 5, wherein the silicon dioxide layer is about 0.2–0.3 μm thick.

7. The integrated varactor and piezoelectric device of claim 5, wherein:

the epitaxial layer is about 5–10 μm thick, the silicon dioxide layer is about 0.2–0.3 μm thick, and the second electrode is about 0.1–0.2 μm thick.

8. An acoustic ink jet ejector, comprising:

a silicon substrate having a first surface;

an integrated varactor and piezoelectric device located on the first surface of the silicon substrate, the silicon substrate being a first electrode, the integrated varactor and piezoelectric device having a second electrode and a third electrode;

an RF power source connected across the first electrode and the third electrode;

control signal means for turning on and off the integrated varactor and piezoelectric device by switching a voltage across the first and second electrodes to high and low voltage levels, respectively; and an acoustic lens located on a second surface of the silicon substrate generally aligned with the integrated varactor and piezoelectric device along an axis perpendicular to the first and second surfaces of the silicon substrate.

9. The acoustic ink jet ejector of claim 8, wherein the integrated varactor and piezoelectric device comprises in order:

an epitaxial layer located over the first surface of the silicon substrate, the epitaxial layer being an active layer of the varactor;

a dielectric layer located over the epitaxial layer;

the second electrode located over the dielectric layer;

a piezoelectric layer located over the second electrode; and the third electrode located over the piezoelectric layer, wherein the epitaxial layer, the dielectric layer, the second electrode, the piezoelectric layer and the third electrode are located over the first surface of the silicon substrate.

10. The acoustic ink jet ejector of claim 9, wherein the epitaxial layer is about 5–10 μm thick.

11. The acoustic ink jet ejector of claim 9, wherein the second electrode is about 0.1–0.2 μm thick.

12. The acoustic ink jet ejector of claim 9, wherein the epitaxial layer is doped to a resistivity of about 10 to 50 Ωcm.

13. The acoustic ink jet ejector of claim 9, wherein the dielectric layer is a silicon dioxide layer.

14. The acoustic ink jet ejector of claim 13, wherein the silicon dioxide layer is about 0.2–0.3 μm thick.

15. The acoustic ink jet ejector of claim 13, wherein:

the epitaxial layer is about 5–10 μm thick, the silicon dioxide layer is about 0.2–0.3 μm thick, and the second electrode is about 0.1–0.2 μm thick.

16. An acoustic ink jet print head, comprising:

a silicon substrate having a first surface and a second surface opposite the first surface;

a plurality of integrated varactor/piezoelectric devices located on the first surface of the silicon substrate, the plurality of integrated varactor/piezoelectric devices arranged in a matrix having a plurality of rows of the integrated varactor/piezoelectric devices and a plurality of columns of the integrated varactor/piezoelectric devices, each of the plurality of integrated varactor/piezoelectric devices using the silicon substrate as a first electrode and having a second electrode and a third electrode, each of the plurality of integrated varactor/piezoelectric devices having a varactor component located on the silicon substrate and a piezoelectric component located on the varactor component, the varactor component located between the silicon substrate and the piezoelectric component;

a plurality of first switches, each first switch electrically connected to a corresponding one of the plurality of rows of the integrated varactor/piezoelectric devices and having a first terminal and a second terminal, the first terminal of each first switch for connection to an RF power source and the second terminal of each first switch connected to the third electrodes of the integrated varactor/piezoelectric devices of the corresponding row of integrated varactor/piezoelectric devices;

a plurality of second switches, each second switch electrically connected to a corresponding one of the plurality of columns of integrated varactor/piezoelectric devices and having a first terminal and a second terminal, the first terminal of each second switch for connection to a DC control voltage source, the second terminal of each second switch connected to the second electrodes of the integrated varactor/piezoelectric devices of the corresponding column of integrated varactor/piezoelectric devices;

a logic circuit having a first terminal connected to each of the plurality of column switches, a second terminal of the logic circuit being connected to each of the plurality of row switches, and a third terminal of the logic circuit receiving commands for turning on and off each column of the plurality of integrated varactor/piezoelectric devices and for turning on and off each row of the plurality of integrated varactor/piezoelectric devices.

17. The acoustic ink jet printhead of claim 16, wherein the logic circuit, in response to a turn-on command, turns on at least one of the plurality of column switches and turns off remaining ones of the plurality of column switches and in response to a column turn-off command, turns off all of the plurality of column switches.

18. The acoustic ink jet printhead of claim 16, wherein the logic circuit, in response to a row turn-on command, turns on at least one of the plurality of row switches and turns off remaining ones of the plurality of row switches and in response to a row turn-off command, turns off all of the plurality of row switches.

19. A method for making an integrated varactor and piezoelectric device, comprising in order the steps of:

providing a silicon substrate, the silicon substrate forming a first electrode of the integrated varactor/piezoelectric device;

forming an epitaxial layer on the silicon substrate, the epitaxial layer forming an active layer of a varactor;

forming a dielectric layer over the epitaxial layer;

forming a second electrode over the silicon dioxide layer;

forming a piezoelectric layer over the second electrode; and forming a third electrode over the piezoelectric layer, wherein the epitaxial layer, the dielectric layer the second electrode, the piezoelectric layer and the third electrode are formed over one side of the silicon substrate.

20. The method of claim 19, wherein the dielectric layer is silicon dioxide.

* * * * *